Patented Dec. 19, 1922.

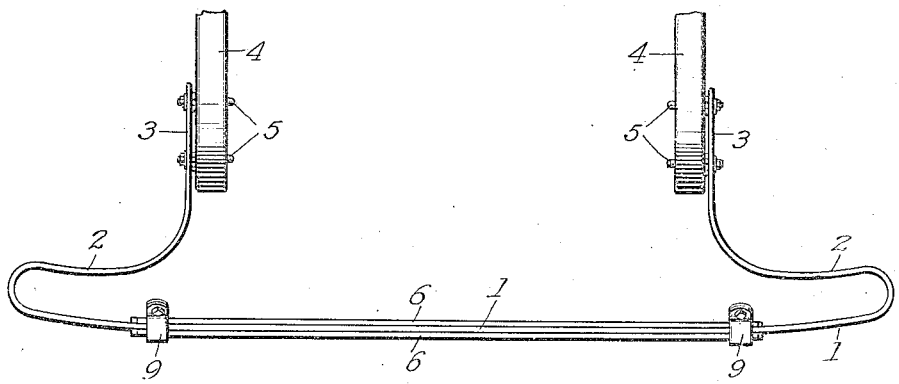
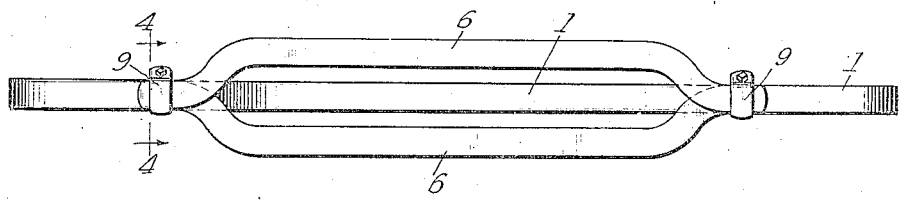
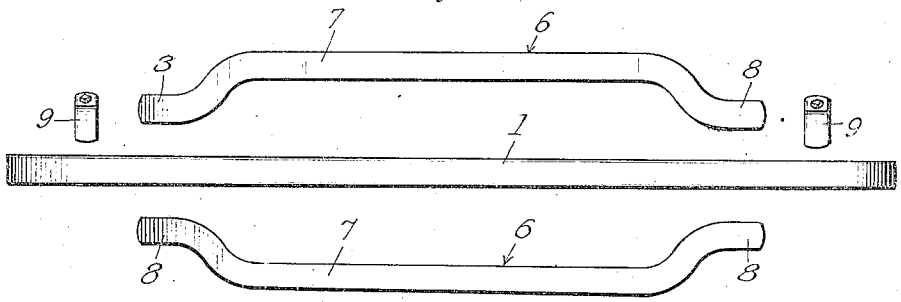
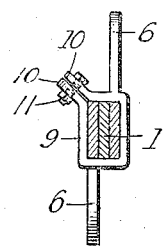

1,439,477

UNITED STATES PATENT OFFICE.

ALLAN L. McGREGOR, OF CHICAGO, ILLINOIS.

AUTOMOBILE BUMPER.

Application filed March 24, 1920. Serial No. 368,468.

*To all whom it may concern:*

Be it known that I, ALLAN L. MCGREGOR, a citizen of the United States, and a resident of Chicago, in the county of Cook and State of Illinois, have invented certain new and useful Improvements in Automobile Bumpers, of which the following is a specification.

This invention relates to improvements in automobile bumpers, and more particularly to an attachment adapted to be secured to bumpers having a single impact bar, said attachment being in the nature of one or more auxiliary bars so designed as to be detachably secured to the central portion of the single impact bar, thereby providing an impact surface of increased area.

The object of the invention is to provide a simple and inexpensive attachment in the nature of suitably designed auxiliary bars which may be attached to any make of the so-called single bar type of bumper whereby the width of the impact portion of the bumper is materially increased, thereby affording greater protection to the vehicle in the event of collision with other vehicles or obstacles.

The features embodying my invention are hereinafter more fully set forth and illustrated in the accompanying drawings, in which—

Fig. 1 is a top plan view of the common form of bumper with the auxiliary bars attached thereto.

Fig. 2 is a front view in elevation of the bumper with the auxiliary bars attached, Fig. 3 is a view similar to Figure 2 with the parts disconnected and slightly removed from their positions of attachment, and Fig. 4 is an enlarged detailed view in cross section taken on line 4—4 of Figure 2.

A suitable form of bumper with which my attachment is adapted to be employed is of the so-called resilient bar type that is formed of flat bar stock of suitable metal, and having those qualities of resiliency necessary to absorb the impact of collision and to protect the vehicle. A simple form of such a bumper comprises a forward impact member 1 having its end portions 2 bent rearwardly and laterally inward in U-shape to form the extremities of the bumper, and further bent in a rearward direction to provide straight free end portions 3—3 extending parallel with the longitudinal frame members 4—4 of the vehicle, and attached thereto by means of suitable bolts 5—5. As before suggested, a bumper constructed in this manner may be termed a single bar bumper inasmuch as it has but a single impact member to receive the impact with objects with which the vehicle may collide.

The attachment herein referred to consists generally in a pair of auxiliary bars 6, preferably shorter in length than the length of the impact bar 1 of the bumper, and so fashioned as to be capable of being clamped at their ends to the impact bar 1 and to be offset vertically in opposite directions from the said impact bar 1 and to bear a parallel and spaced relation thereto. Referring to one of these auxiliary bars 6 of which I preferably employ two, the same is formed of resilient bar material preferably of the same character as and quality of the impact bar 1. Each bar consists of a central portion 7 and relatively short end portions 8 offset laterally from the intermediate portion 7 and lying substantially in the same plane thereof. The offsetting of the end portions from the central portion may be accomplished by bending or otherwise upsetting the bar, the connecting portions being curved and resembling the letter S.

As shown in Figures 3 and 4, two auxiliary bars 6—6 may be employed, one of these bars having its intermediate portion offset above the impact bar 1 and the other having its intermediate portion offset in the opposite direction; namely, downwardly from said impact bar 1. As shown in Figure 4 these bars may be applied to the impact bar 1 by placing the end portions 8—8 of the upper bar against the front face of the impact bar 1, and the like portions of the lower auxiliary bar against the rear face of the impact bar 1, so that the said auxiliary bar 6 and the impact bar 1 lie substantially in the same vertical plane, although, as illustrated, they will be slightly offset by reason of the thickness of the bars. The auxiliary bars are secured in position by means of clamps 9—9, preferably of the split form, which are adapted to surround the end portions 8—8 of the auxiliary bars, and to clamp the same tightly to the impact bar 1. The clamps 9—9 are preferably formed rectangular to conform to the cross-section of the bars embraced thereby, and are provided with lugs 10—10 extending diagonally from one corner thereof and adapted to receive a bolt 11 which may be drawn tight in the act of securing the auxiliary bars in clamped position.

An ordinary bumper may, by the use of the auxiliary bars 6, be easily and quickly transformed into one having parallel and vertically spaced bars; extending throughout the central portion thereof and providing a materially increased impact surface serving to afford a greater degree of protection. Obviously, this transformation can be carried out with any single bar bumper by merely purchasing the auxiliary bars and clamps; hence, it is unnecessary to replace a single bar bumper already in use by a new bumper in which the increased impact area feature is permanently incorporated in its structure. The obvious advantage of the attachment is the comparatively small cost in securing the desirable advantages of a multiple bar bumper without necessitating the discarding of a single bar bumper already in use and providing a new bumper complete.

It is manifest that the invention may be applied to all types of bumpers, and the parts herein described and illustrated may be modified in their details of construction and formation to correspond with any particular type of bumper. Therefore, I do not wish to be limited as to the scope of the invention except as it is hereinafter specifically set forth in the appended claims.

I claim as my invention:

1. A vehicle bumper comprising an impact bar and a pair of auxiliary bars each having longitudinally spaced portions secured to said impact bar and an intermediate portion offset from such securing portions, the intermediate portions of said auxiliary bars projecting in opposite directions from said impact bar.

2. A vehicle bumper comprising an impact bar and a pair of auxiliary bars each having end portions and an intermediate portion offset from such end portions, said auxiliary bars being arranged with their intermediate portions projecting in opposite directions from said impact bar, and a pair of clamping members each embracing the impact bar and the corresponding end portions of said auxiliary bars and securing the latter bars to the former bars.

3. A bumper comprising end portions adapted to be secured to a vehicle, and a pair of auxiliary bars each having longitudinally spaced portions secured to said bumper end portions, respectively, and an intermediate portion offset from such securing portions, the intermediate portions of said auxiliary bars projecting in opposite directions from such bumper end portions.

In witness whereof, I hereunto subscribe my name this 20th day of March, A. D. 1920.

ALLAN L. McGREGOR.